(12) United States Patent
Ohtsuka

(10) Patent No.: US 11,142,181 B2
(45) Date of Patent: Oct. 12, 2021

(54) CONTROL DEVICE OF HYBRID VEHICLE

(71) Applicant: TOYOTA JIDOSHA KABUSHIKI KAISHA, Toyota (JP)

(72) Inventor: Kaoru Ohtsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 330 days.

(21) Appl. No.: 16/360,650

(22) Filed: Mar. 21, 2019

(65) Prior Publication Data
US 2019/0291715 A1 Sep. 26, 2019

(30) Foreign Application Priority Data
Mar. 23, 2018 (JP) .............................. JP2018-056907

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *F02D 13/0261* (2013.01); *F02D 41/021* (2013.01); *F02M 26/00* (2016.02); *B60K 6/46* (2013.01); *B60W 2510/244* (2013.01); *B60W 2710/0622* (2013.01); *B60Y 2200/92* (2013.01); *F02D 2200/503* (2013.01); *F02M 2026/009* (2016.02)

(58) Field of Classification Search
CPC ................ B60W 20/13; B60W 10/06; B60W 2510/244; B60W 2710/0622; B60W 2710/06; B60W 2510/246; F02M 26/00; F02M 2026/009; F02D 13/0261; F02D 41/021; F02D 2200/503; B60Y 2200/92; B60K 6/46; Y02T 10/40; Y02T 10/62
See application file for complete search history.

(56) References Cited

U.S. PATENT DOCUMENTS 9,908,522 B2 3/2018 Ikedaya et al.
2013/0184968 A1* 7/2013 Kumano .................. B60L 1/006
701/102
(Continued)

FOREIGN PATENT DOCUMENTS

JP 11-252709 A 9/1999
JP 2011-178200 A 9/2011
(Continued)

*Primary Examiner* — Marthe Y Marc-Coleman
(74) *Attorney, Agent, or Firm* — Sughrue Mion, PLLC

(57) ABSTRACT

A control device of a hybrid vehicle, the hybrid vehicle including an engine, a motor as a traveling power source, and a battery in which electric power to be supplied to the motor is charged, includes: a transient operation controller performing, when absolute values of an outputtable electric power and a chargeable electric power of the battery are small at a time of a transient operation of the engine, a transient operation of controlling an operating point of the engine within a wide range from low output to high output, at a position where a thermal efficiency is lower than the thermal efficiency at a time of a steady operation, and of controlling the engine to be in a combustion state where a margin to a combustion limit is greater than the margin in the steady operation.

6 Claims, 12 Drawing Sheets

(51) Int. Cl.
*F02M 26/00* (2016.01)
*F02D 13/02* (2006.01)
*F02D 41/02* (2006.01)
*B60K 6/46* (2007.10)

(56) References Cited

U.S. PATENT DOCUMENTS

2015/0258977 A1* 9/2015 Jeong ................ B60W 30/1882
    701/22
2016/0121874 A1* 5/2016 Muto ........................ B60K 6/26
    701/22

FOREIGN PATENT DOCUMENTS

| | | |
|---|---|---|
| JP | 2015-128933 A | 7/2015 |
| JP | 2016-159858 A | 9/2016 |
| JP | 2016-159859 A | 9/2016 |

\* cited by examiner

CONTROL DEVICE OF HYBRID VEHICLE

CROSS-REFERENCE TO RELATED APPLICATION(S)

The present application claims priority to and incorporates by reference the entire contents of Japanese Patent Application No. 2018-056907 filed in Japan on Mar. 23, 2018.

BACKGROUND

The present disclosure relates to a control device of a hybrid vehicle.

Japanese Laid-open Patent Publication No. H11-252709 discloses a control device that is applied to a series hybrid vehicle, in which, when a voltage of a battery connected to a motor for traveling is equal to or lower than a predetermined value, a rotational speed of an engine is reduced to a rotational speed which is lower than that during normal operation.

As illustrated in FIG. 16, with respect to a battery which is to be installed in an above-mentioned vehicle, it is known that amounts of outputtable electric power Wout and chargeable electric power Win (battery usable range) change depending on a battery temperature. Due to this, in the configuration described in Japanese Laid-open Patent Publication No. H11-252709, a transient operation of the engine is required when absolute values of the outputtable electric power and the chargeable electric power of the battery are small, and if combustion control is performed so as to maximize combustion efficiency of the engine during the transient operation, the combustion in the engine may become unstable.

SUMMARY

There is a need for providing a control device which is for a hybrid vehicle, and which is capable of stabilizing a combustion state of an engine at a time of transient operation of the engine.

According to an embodiment, a control device of a hybrid vehicle, the hybrid vehicle including an engine, a motor as a traveling power source, and a battery in which electric power to be supplied to the motor is charged, includes: a transient operation controller performing, when absolute values of an outputtable electric power and a chargeable electric power of the battery are small at a time of a transient operation of the engine, a transient operation of controlling an operating point of the engine within a wide range from low output to high output, at a position where a thermal efficiency is lower than the thermal efficiency at a time of a steady operation, and of controlling the engine to be in a combustion state where a margin to a combustion limit is greater than the margin in the steady operation

DETAILED DESCRIPTION

Hereinafter, a control device for a hybrid vehicle according to embodiments of the present disclosure will be specifically described with reference to the accompanying drawings. Note that the present disclosure is not limited to the embodiments described below.

First Embodiment

Figure 1:
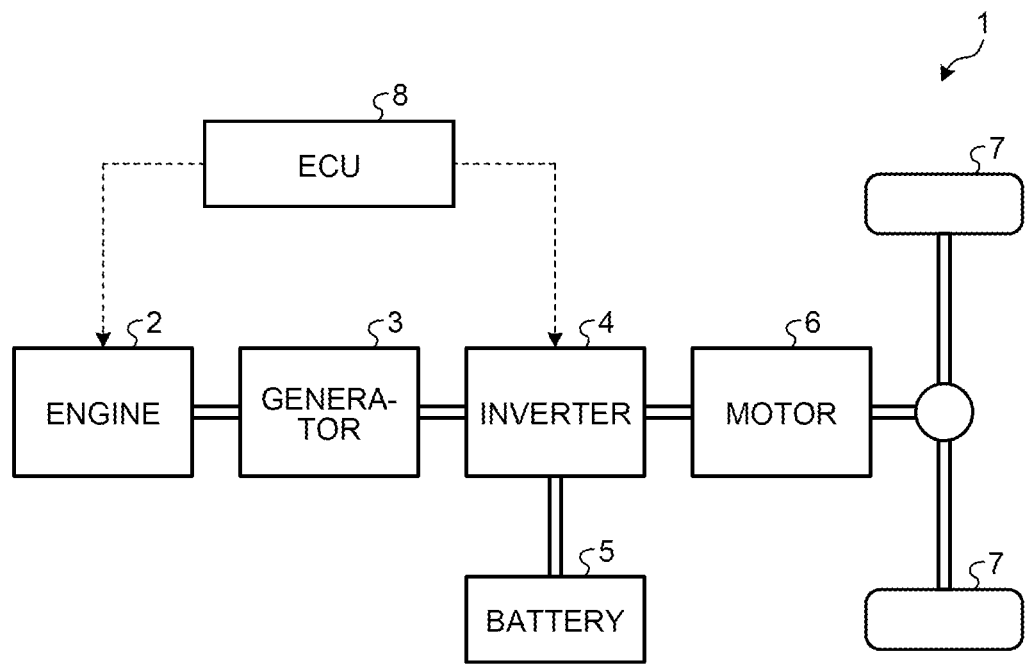
FIG. 1 is an explanatory diagram illustrating a schematic configuration of a hybrid vehicle according to a first embodiment.

FIG. 1 is an explanatory diagram illustrating a schematic configuration of a hybrid vehicle according to a first embodiment. A hybrid vehicle (hereinafter simplified as "vehicle") 1 refers to a vehicle on which a series hybrid system is installed. As illustrated in FIG. 1, the vehicle 1 include an engine 2 for electric power generation, a generator 3, an inverter 4, a battery 5, a motor 6 for traveling, and driving wheels 7. The vehicle 1 further includes an Electronic Control Unit (ECU) 8 for performing various types of control.

The vehicle 1 stores, in the battery 5, electric power that is generated by driving the generator 3 by power output from the engine 2. At the time of acceleration (power running), the motor 6 is driven by electric power output from the battery 5, and the driving wheels 7 are driven by the power output from the motor 6. At the time of braking (regeneration), the motor 6 is caused to function as a generator by an external force that is transmitted from the driving wheels 7 to the motor 6, and electric power generated by the motor 6 is stored in the battery 5.

The engine 2 satisfies one of: being an internal combustion engine capable of lean-burn operation; including an Exhaust Gas Recirculation device (EGR device); and including a Variable Valve Timing mechanism (VVT mechanism). The engine 2 is capable of performing a lean burn at an air-fuel ratio which is on a lean side than a stoichiometric air-fuel ratio. The Exhaust Gas Recirculation device provided at the engine 2 recirculates a part of exhaust gas, as EGR gas, from an exhaust passage to an intake passage through an EGR valve (none of which are illustrated). The Variable Valve Timing mechanism provided at the engine 2 is capable of changing an overlap amount (valve overlap amount) between a period when an intake valve is open and a period when an exhaust valve is open (none of which are illustrated). In the description, the air-fuel ratio may be simplified as "A/F", exhaust gas recirculation as "EGR", and a variable valve timing as "VVT".

The generator 3 is a motor-generator for electric power generation having a motor function in addition to an electric power generation function. The motor 6 is a motor-generator for driving, having the electric power generation function in addition to the motor function. The generator 3 is electrically connected to the motor 6 via the inverter 4. The battery 5 is electrically connected to the generator 3 and the motor 6 via the inverter 4. Electric power for driving the motor 6 is charged to the battery 5. The electric power generated by the generator 3 may be directly supplied from the generator 3 to the motor 6 via the inverter 4 without being charged to the battery 5.

Figure 16:
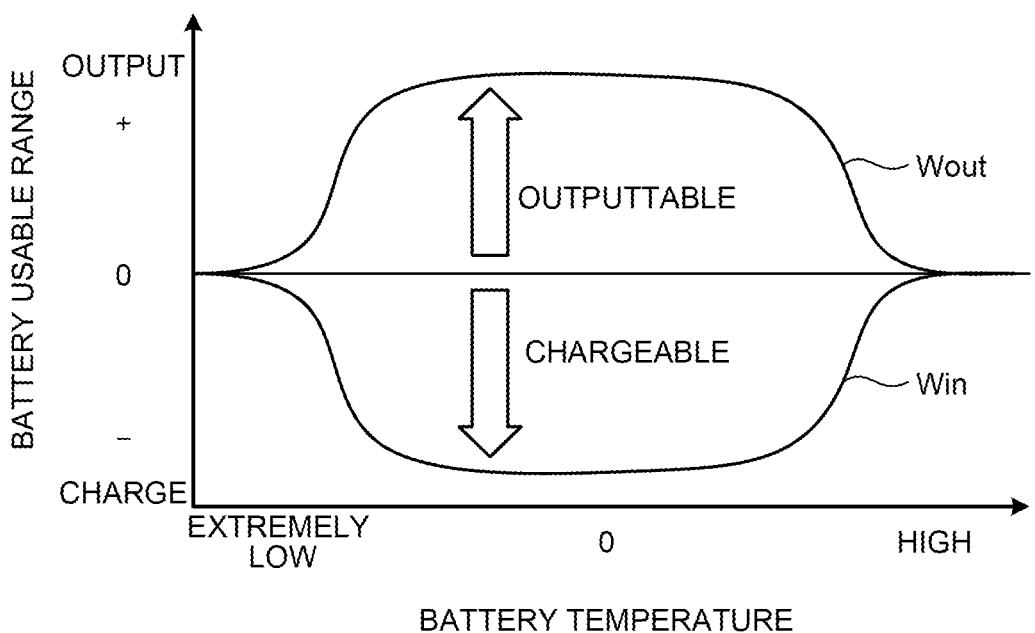
FIG. 16 is an explanatory diagram illustrating changes in an outputtable range and a chargeable range of a battery in relation to a temperature change.

The vehicle 1 further includes one of a system for monitoring a state of the battery 5 by a battery temperature sensor (not illustrated) or the like that detects a temperature of the battery 5, a system which is capable of detecting deterioration or failure of the battery 5, and a system which is capable of monitoring a State Of Charge (hereinafter "SOC") of the battery 5. For example, in the case of the monitoring system which uses the battery temperature, a signal indicating a measured value of the battery temperature is input to the electronic control unit 8 from the battery temperature sensor, and outputtable electric power Wout and chargeable electric power Win of the battery 5 are variably controlled based on the input signal. The outputtable electric power Wout and the chargeable electric power Win of the battery 5 are reduced when the battery temperature is an extremely low or high temperature (see FIG. 16). In the case of the system that monitors the SOC of the battery 5, the electronic control unit 8 may calculate the outputtable electric power Wout and the chargeable electric power Win by using the SOC of the battery 5. The outputtable electric power Wout changes depending on the SOC. In the case where the SOC is high, the outputtable electric power Wout is increased, and in the case where the SOC is low, the outputtable electric power Wout is reduced. Additionally, the SOC represents a remaining amount of charge in the battery 5.

Figure 2:
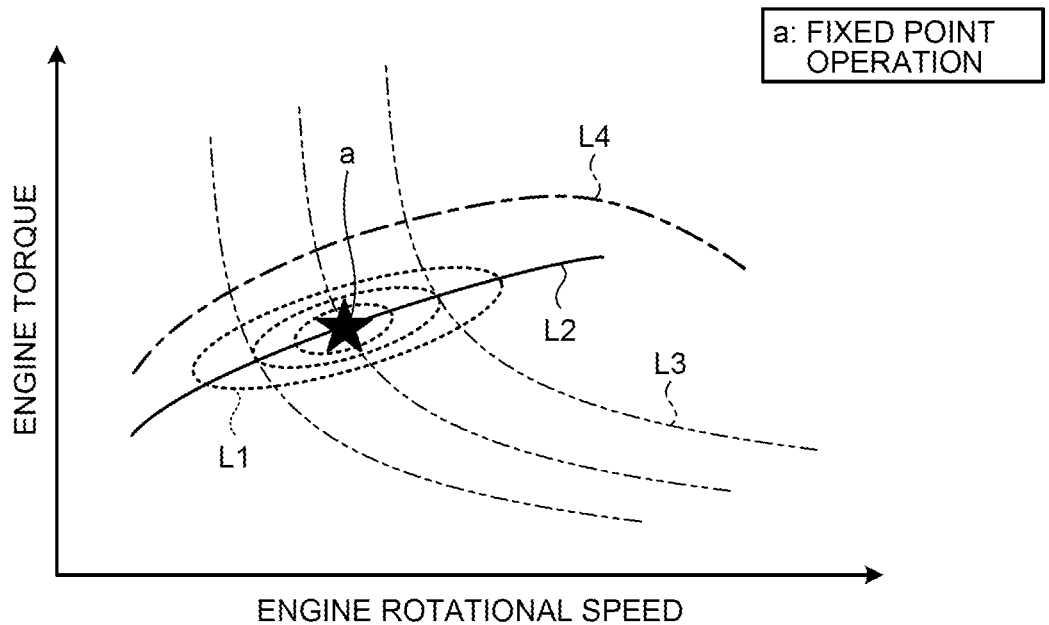
FIG. 2 is a map indicating operating characteristics of an engine.

The electronic control unit 8 performs engine control of making a combustion state of the engine 2 variable based on an outputtable state and a chargeable state of the battery 5. In this case, the electronic control unit 8 performs fixed point operation control of performing fixed point operation in which an operating point (engine rotational speed, engine torque) of the engine 2 is fixed at an operating point where optimum efficiency is achieved, and transient operation control of performing a transient operation in which the operating point of the engine 2 is controlled to be on a fuel efficiency line. At the time of the fixed point operation, the combustion is stable due to the operating point being fixed, and thus, control is performed to achieve a combustion state in which combustion efficiency of the engine 2 is on a high-efficiency side (see FIGS. 2 and 4). The operating point at a time of a steady operation is illustrated in FIG. 2. At the time of the transient operation, the operating point moves on the fuel efficiency line, and thus, control is performed to achieve a state with a high combustion robustness (see FIGS. 3 and 4). The operating point at the time of the transient operation is illustrated in FIG. 3.

FIG. 2 is a map indicating operating characteristics of the engine. FIG. 3 is a diagram illustrating operating points in the steady operation and the transient operation. The operating point of the engine 2 (i.e., an engine operating point) is defined based on the engine rotational speed and the engine torque. As indicated by a dotted line, a fuel efficiency contour line L1 is a line connecting engine operating points with equal thermal efficiency of the engine 2. A center side of the fuel efficiency contour line L1 is a high-efficiency range. A center of the fuel efficiency contour line L1 is an operating point where optimum fuel efficiency is achieved. On the other hand, a line on an outer side of a plurality of fuel efficiency contour lines L1 is a fuel efficiency contour line L1 with lowest thermal efficiency. As indicated by a solid line, a fuel efficiency line L2 is a line connecting operating points where optimum fuel efficiency is achieved for the engine 2 when same engine output is obtained (i.e., optimum fuel efficiency line). As indicated by a dash-dot-dotted line, an equal output line L3 is a curved line connecting operating points with equal engine output. Of a plurality of equal output lines, a line on an upper right side in the map in FIG. 2 is an equal output line L3 on a high-output side. As indicated by a dash-dotted line, a maximum torque line L4 is a line indicating a relationship between the engine rotational speed and the maximum torque of the engine 2.

Figure 3:
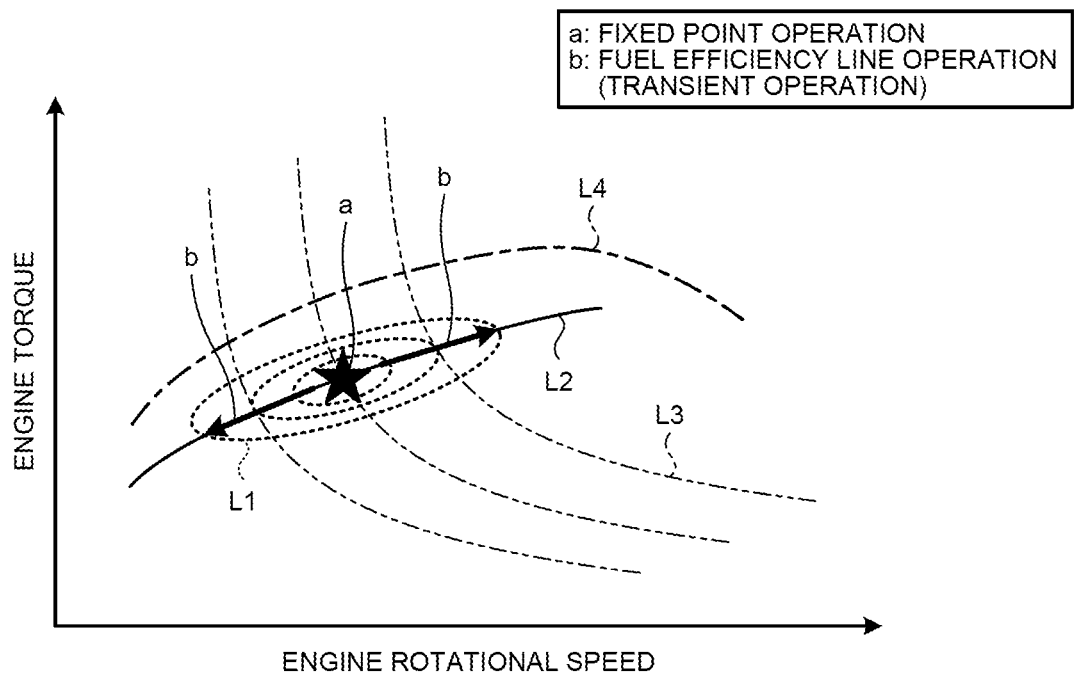
FIG. 3 is a diagram illustrating operating points in a steady operation and a transient operation.

Operating points a, which are illustrated as a star in FIGS. 2 and 3, are operating points at a time of fixed point operation of the engine 2, and are operating points where optimum thermal efficiency is achieved for the engine 2. Fixed point operation is operation of the engine 2 in a state where the operating point is fixed at a point where the optimum thermal efficiency is achieved. The transient operation is an operation state where the operating point of the engine 2 can be moved to satisfy vehicle requested power, and is an operation of the engine 2 in a state where engine output is variable on the fuel efficiency line L2 even if thermal efficiency is reduced than that at the time of the fixed point operation. Black arrows b in FIG. 3 indicate a fuel efficiency line operation, and indicate that the operating point moves on the fuel efficiency line L2 at the time of the transient operation of the engine 2. The fuel efficiency line operation is the transient operation, and is an operation state allowing a movement of the operating point to a position (range) where the thermal efficiency is lower than that at the operating point a with the maximum thermal efficiency. The operating point a at the time of fixed point operation is positioned on the fuel efficiency line L2.

Specifically, the engine 2 performs the fixed point operation in the case where the outputtable range and the chargeable range of the battery 5 are wide. At the time of the fixed point operation, the combustion state of the engine 2 is controlled aiming at the maximum combustion efficiency (see FIG. 4). For example, in the case of performing the lean-burn operation at the time of the fixed point operation, an operation is performed at an air-fuel ratio (lean limit) with a margin to a lean-side combustion limit (system limit value) within a range of air-fuel ratio allowing combustion. The lean limit refers to a limit value (very lean) on a lean side within a range of air-fuel ratio which achieves stable combustion at the time of the fixed point operation. In the case of increasing combustion efficiency by the EGR device at the time of the fixed point operation, an operation is performed at an EGR ratio (external EGR limit) with a margin to a combustion limit (system limit value) on an EGR gas large-amount side within a range of EGR ratio allowing combustion. The external EGR limit refers to a limit value (large amount of EGR) on the EGR gas large-amount side within a range of the EGR ratio which achieves a stable combustion at the time of the fixed point operation. In the case of increasing combustion efficiency by the VVT mechanism at the time of the fixed point operation, an operation is performed at a maximum VVT overlap amount with a margin to a limit value (system limit value) on a large overlap amount side within a range of VVT overlap amount allowing combustion. The maximum VVT overlap amount refers to a limit value (amount of internal EGR) on a side of a large overlap amount within a range of VVT overlap amount which achieves a stable combustion at the time of the fixed point operation. A detailed description with reference to FIG. 4 will be given below.

In contrast, in a case where the outputtable range and the chargeable range of the battery 5 are narrow due to the battery temperature being reduced due to an outside temperature of the vehicle 1 or the like, the engine 2 performs the transient operation. In the transient operation, an engine operation range where an operating point can be set is increased on the fuel efficiency line L2, and an operation is performed in a state with high combustion robustness. In the combustion state at the time of the transient operation, with respect to the air-fuel ratio, an operation is performed at an air-fuel ratio (moderately lean) with a margin to the lean limit (very lean). In the combustion state at the time of the transient operation, with respect to the EGR ratio, an operation is performed at an EGR ratio (moderate amount of EGR) with a margin to the external EGR limit (large amount of EGR). In the combustion state at the time of the transient operation, with respect to the VVT overlap amount, an operation is performed by reducing the VVT overlap amount (amount of internal EGR) and reducing the amount of internal EGR than that at the time of a steady operation.

Figure 4:
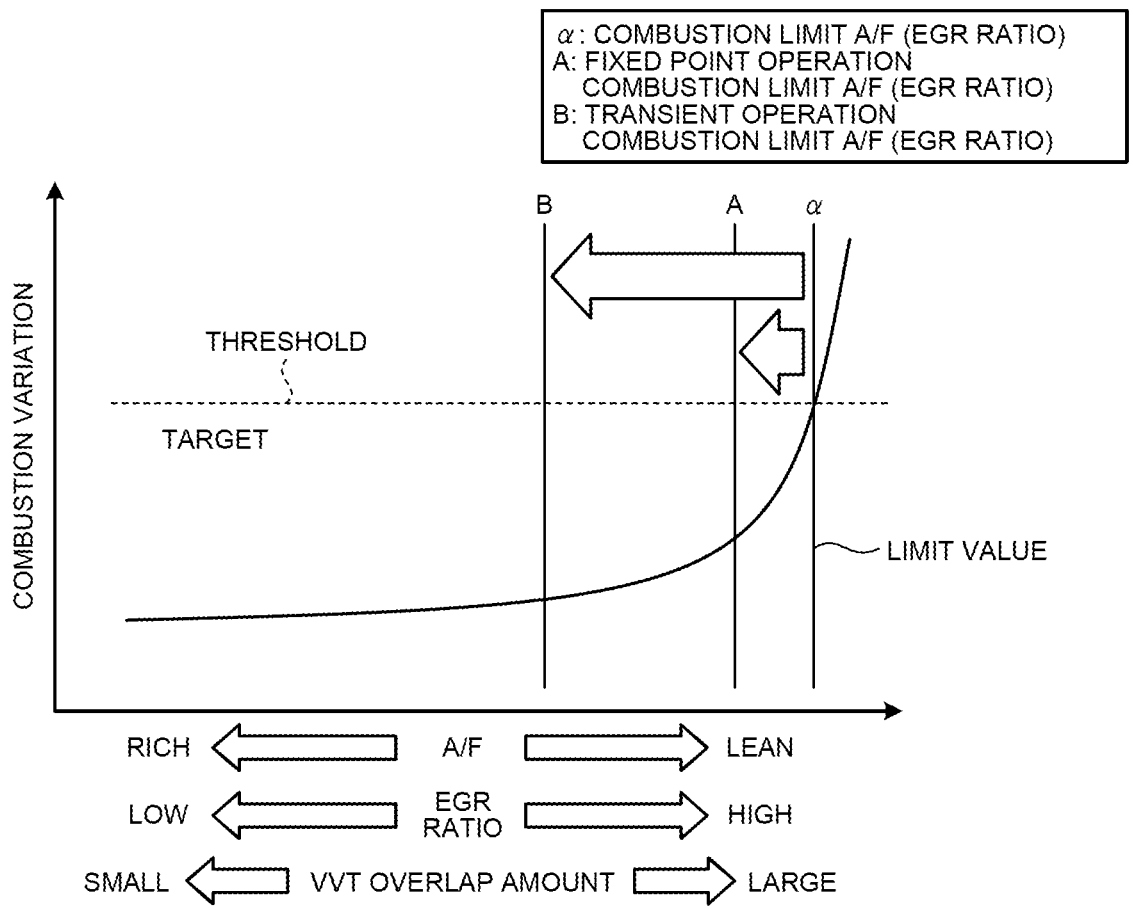
FIG. 4 is a diagram illustrating a relationship between a combustion state and a combustion variation of the engine.

FIG. 4 is a diagram illustrating a relationship between a combustion state and a combustion variation of the engine 2. The vertical axis in FIG. 4 indicates the combustion variation of the engine 2. With respect to the vertical axis, an operation range where the combustion variation is smaller than a threshold is a target range. The horizontal axis in FIG. 4 indicates one of the air-fuel ratio (A/F), the EGR ratio, and the VVT overlap amount. With respect to the horizontal axis, an operation range where each value is smaller than the limit value (system limit value) is a target range.

In the case where the horizontal axis in FIG. 4 indicates the air-fuel ratio, a left side is a rich side and a right side is a lean side. The curved line in FIG. 4 indicates a relationship between the combustion variation and the air-fuel ratio. As indicated by the curved line, the combustion variation is small when the air-fuel ratio is on the rich side, and the combustion variation is great when the air-fuel ratio is on the lean side. On the lean side, the curved line reaches a threshold which is an upper limit value of a range where the combustion variation is allowed. The air-fuel ratio on the lean side where the curved line reaches the threshold is the system limit value. In FIG. 4, The sign "α" denotes a combustion limit A/F as the system limit value (combustion limit), the sign "A" denotes a control target A/F as a control target value at the time of the fixed point operation, and the sign "B" denotes a control target A/F as a control target value at the time of the transient operation. The control target value A is the limit value on the lean side within the range of air-fuel ratio which achieves stable combustion at the time of the fixed point operation. With respect to the A/F, the control target value A at the time of the fixed point operation is set to an air-fuel ratio more on the rich side than the system limit value α is, and has a margin to the system limit value α. Furthermore, with respect to the A/F, the control target value B at the time of the transient operation is controlled to an air-fuel ratio more on the rich side than the control target value A at the time of the fixed point operation is. That is, with respect to the A/F, the margin of the control target value B at the time of the transient operation to the system limit value α (combustion limit) is greater than the margin of the control target value A at the time of the fixed point operation to the system limit value α (combustion limit).

In the case where the horizontal axis in FIG. 4 indicates the EGR ratio, the left side is a low EGR-ratio side, and the right side is a high EGR-ratio side. The curved line in FIG. 4 indicates a relationship between the combustion variation and the EGR ratio. As indicated by the curved line, the combustion variation is small when the EGR ratio is on the low side, and the combustion variation is great when the EGR ratio is on the high side. The EGR ratio on the high side where the curved line reaches the threshold is the system limit value. In FIG. 4, the sign "α" denotes a combustion limit EGR ratio as the system limit value, the sign "A" denotes a control target EGR ratio as a control target value at the time of the fixed point operation, and the "B" denotes a control target EGR ratio as a control target value at the time of the transient operation. The control target value A is the limit value on the EGR gas large-amount side within the range of the EGR ratio which achieves stable combustion at the time of the fixed point operation. With respect to the EGR ratio, the control target value A at the time of the fixed point operation is set more on the EGR gas small-amount side than the system limit value α is, and has a margin to the system limit value α. Furthermore, with respect to the EGR ratio, the control target value B at the time of the transient operation is controlled to be more on the EGR gas small-amount side than the control target value A at the time of the fixed point operation is. That is, with respect to the EGR ratio, the margin of the control target value B at the time of the transient operation to the system limit value α (combustion limit) is greater than the margin of the control target value A at the time of the fixed point operation to the system limit value α (combustion limit).

In the case where the horizontal axis in FIG. 4 indicates the VVT overlap amount, the left side indicates that a valve overlap amount between the intake valve and the exhaust valve is small, and the right side indicates that the valve overlap amount between the intake valve and the exhaust valve is large. The curved line in FIG. 4 indicates a relationship between the combustion variation and the VVT overlap amount. As indicated by the curved line, the combustion variation is small on the side where the VVT overlap amount is small, and the combustion variation is great on the side where the VVT overlap amount is large. The VVT overlap amount on the large side where the curved line reaches the threshold is the system limit value. In FIG. 4, the sign "α" denotes the VVT overlap amount as the system limit value, the sign "A" denotes the VVT overlap amount as a control target value at the time of the fixed point operation, and the sign "B" denotes the VVT overlap amount as a control target value at the time of the transient operation. The control target value A is the limit value on the side where the overlap amount is large within the range of the VVT overlap amount which achieves stable combustion at the time of the fixed point operation. With respect to the VVT overlap amount, the control target value A at the time of the fixed point operation is set on a side where the overlap amount is smaller than the system limit value α is, and has a margin to the system limit value α. Furthermore, with respect to the VVT overlap amount, the control target value B at the time of the transient operation is controlled to be a VVT overlap amount on the side where the overlap amount is smaller than the control target value A at the time of the fixed point operation is. That is, with respect to the VVT overlap amount, the margin of the control target value B at the time of the transient operation to the system limit value α (combustion limit) is greater than the margin of the control target value A at the time of the fixed point operation to the system limit value α (combustion limit).

Figure 5:
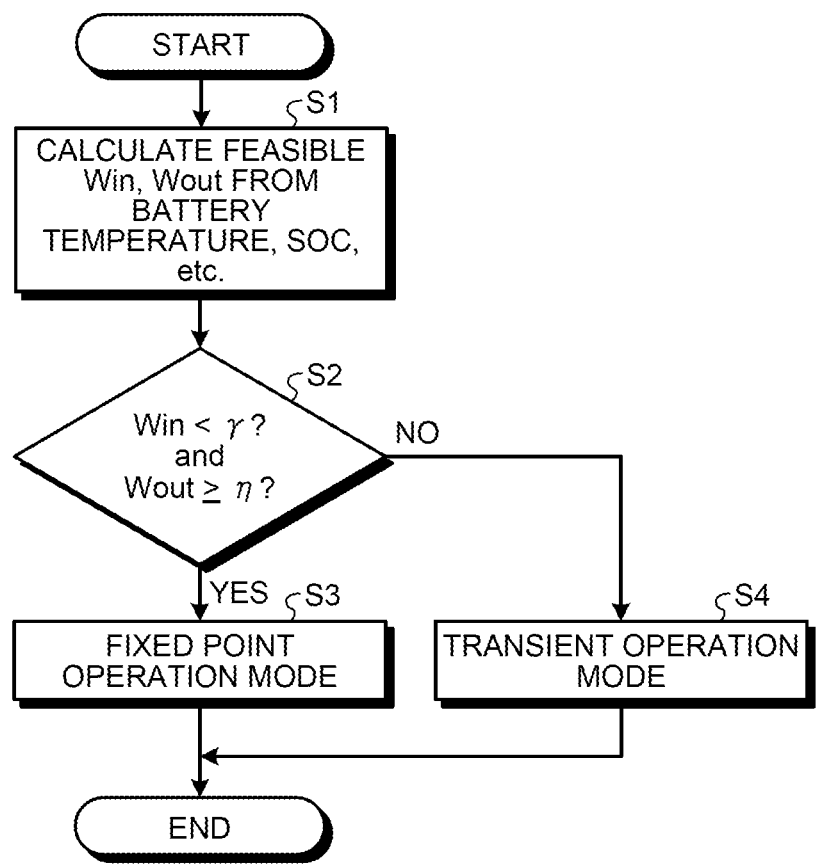
FIG. 5 is a flowchart illustrating a control flow for selecting an operation mode.

FIG. 5 is a flowchart illustrating a control flow for selecting an operation mode. The control indicated in FIG. 5 is performed by the electronic control unit 8.

As illustrated in FIG. 5, the electronic control unit 8 calculates the chargeable electric power Win and the outputtable electric power Wout in a current state of the battery 5 based on the battery temperature, the SOC and the like (step S1). The outputtable electric power Wout calculated in step S1 takes a positive value, and the chargeable electric power Win takes a negative value.

The electronic control unit 8 determines whether the chargeable electric power Win is smaller than an adaptive value γ, and whether the outputtable electric power Wout is at or greater than an adaptive value η (step S2). The adaptive value γ and the adaptive value η are adaptive values that are determined based on power characteristics expected of the vehicle 1. That the chargeable electric power Win is small in step S2 means that an absolute value of the negative value is great, and indicates that there is a large amount of chargeable power.

In the case where it is positively determined in step S2 that the chargeable electric power Win is smaller than the adaptive value γ, and that the outputtable electric power Wout is at or greater than the adaptive value η (step S2: Yes), the electronic control unit 8 selects a fixed point operation mode (step S3). When step S3 is performed, this control routine ends.

In the case where negative determination is made in step S2 (step S2: No), the electronic control unit 8 selects a transient operation mode (step S4). When step S4 is performed, this control routine ends.

Figure 6:
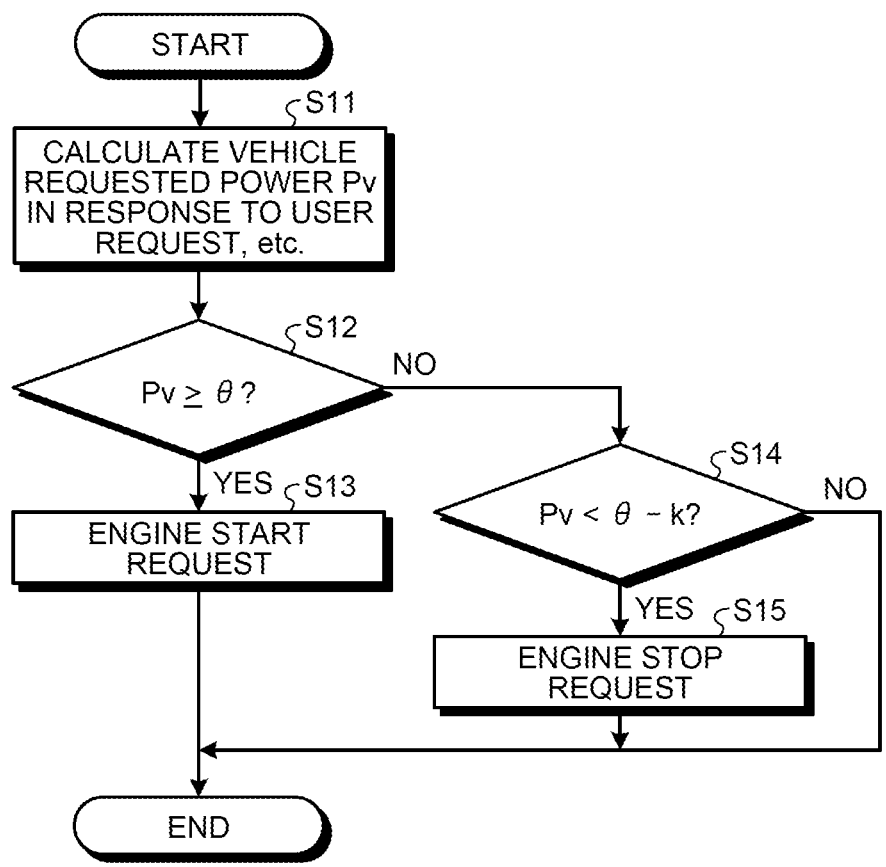
FIG. 6 is a flowchart illustrating a control flow for determining whether the engine should be started.

FIG. 6 is a flowchart illustrating a control flow for determining whether the engine should be started. The control indicated in FIG. 6 is performed by the electronic control unit 8.

As illustrated in FIG. 6, the electronic control unit 8 calculates vehicle requested power Pv in response to a user request or the like (step S11). A user request may be detection of depression of an accelerator pedal by a driver. In step S11, the vehicle requested power Pv is calculated based on an accelerator opening in accordance with an amount of depression of the accelerator pedal, and a current vehicle speed detected by a vehicle speed sensor.

The electronic control unit 8 determines whether the vehicle requested power Pv calculated in step S11 is at or greater than an adaptive value θ (step S12). The adaptive value θ is an adaptive value that is determined taking into account a current SOC and an optimum fuel consumption.

In the case where the positive determination is made in step S12 with the vehicle requested power Pv being at or greater than the adaptive value θ (step S12: Yes), the electronic control unit 8 outputs an engine start request (step S13). When step S13 is performed, the control routine ends.

In the case where the negative determination is made in step S12 with the vehicle requested power Pv being smaller than the adaptive value θ (step S12: No), the electronic control unit 8 determines whether the vehicle requested power Pv is smaller than a value that is obtained by subtracting a hysteresis value k from the adaptive value θ (step S14). In the case where the negative determination is made in step S14 (step S14: No), the control routine ends.

In the case where the positive determination is made in step S14 (step S14: Yes), the electronic control unit 8 outputs an engine stop request (step S15). When step S15 is performed, the control routine ends.

Figure 7:
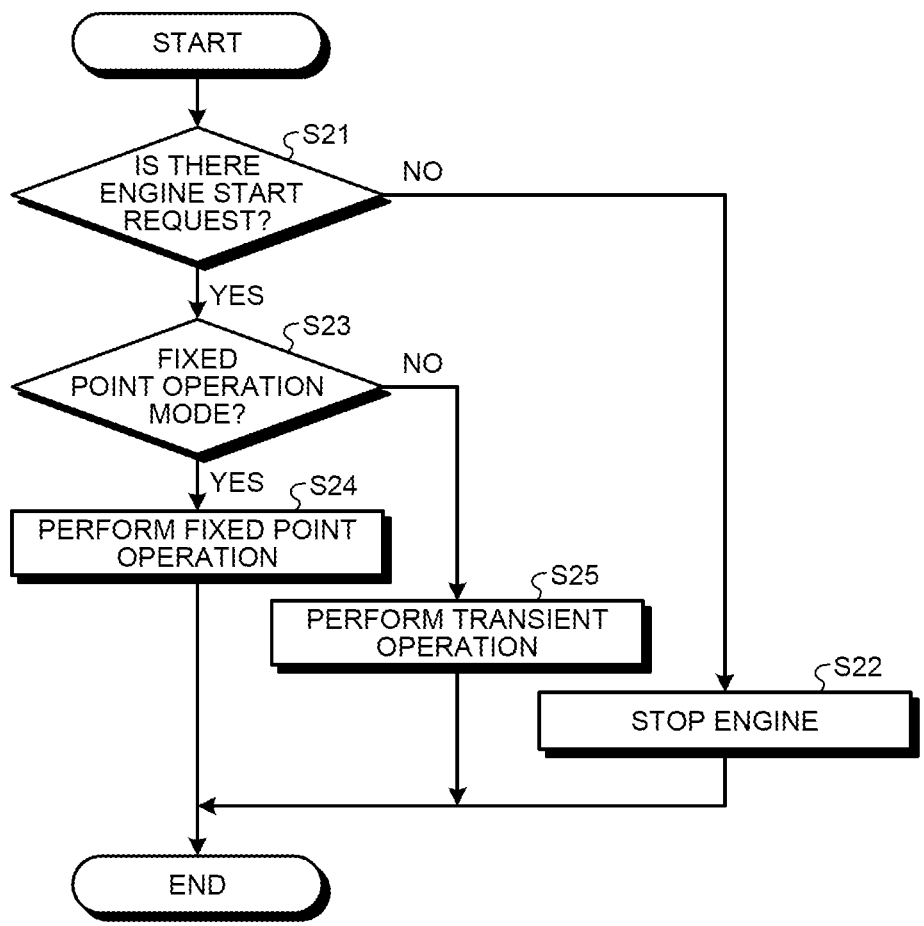
FIG. 7 is a flowchart illustrating an operation control flow according to the first embodiment.

FIG. 7 is a flowchart illustrating an operation control flow according to the first embodiment. The control indicated in FIG. 7 is performed by the electronic control unit 8.

As illustrated in FIG. 7, the electronic control unit 8 determines whether there is an engine start request (step S21). In step S21, whether an engine start request is output by execution of step S13 in FIG. 6 is determined.

In the case where the negative determination is made in step S21 due to there being no engine start request (step S21: No), the electronic control unit 8 stops the engine 2 (step S22). When step S22 is performed, the control routine ends.

In the case where the positive determination is made in step S21 due to there being an engine start request (step S21: Yes), the electronic control unit 8 determines whether the operation mode is the fixed point operation mode (step S23). In step S23, whether the fixed point operation mode is selected by execution of step S3 in FIG. 5 is determined.

In the case where the positive determination is made in step S23 with the operation mode being the fixed point operation mode (step S23: Yes), the electronic control unit 8 performs the fixed point operation of the engine 2 (step S24). In step S24, the fixed point operation described above is performed. The electronic control unit 8 includes a fixed point operation control unit that performs the fixed point operation. When step S24 is performed, the control routine ends.

In the case where the negative determination is made in step S23 with the operation mode not being the fixed point operation mode (step S23: No), the electronic control unit 8 performs the transient operation of the engine 2 (step S25). In step S25, the transient operation is performed in a combustion state where there is a great margin to the combustion limit described above. The electronic control unit 8 includes a transient operation control unit that performs the transient operation. When step S25 is performed, the control routine ends.

As described above, according to the first embodiment, the combustion state of the engine 2 is changed between combustion efficiency priority and combustion variation priority, in response to a transient operation request for the engine 2. Improvement in fuel efficiency and reduction in combustion variation (drivability) can thus be both achieved regardless of the vehicle request. At the time of the transient operation of the engine 2 in a state where the outputtable electric power Wout of the battery 5 is small, the engine 2 is controlled to a combustion state with a great margin to the combustion limit while reducing thermal efficiency of the engine 2 than that at the time of steady operation, and thus, a stable combustion state may be realized at the time of the transient operation of the engine while securing fuel efficiency.

Second Embodiment

In a second embodiment, to satisfy the vehicle requested power Pv, output operation is performed, in which an operation range of the engine 2 is increased than that at the time of the transient operation. The electronic control unit 8 according to the second embodiment performs engine control of increasing the operation range of the engine 2, when the vehicle requested power Pv is greater than a sum of an engine output Pec at the time of the fixed point operation and the outputtable electric power Wout of the battery 5. In the description of the second embodiment, the same elements as those in the first embodiment are denoted by the same reference signs, and the descriptions thereof are omitted.

Figure 8:
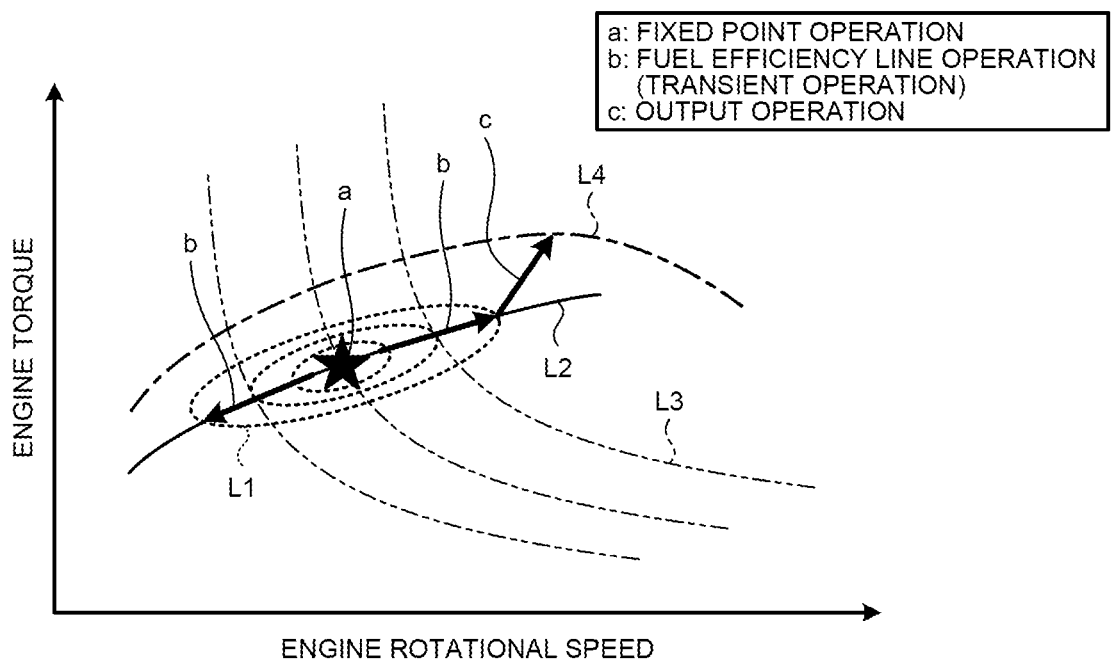
FIG. 8 is a diagram illustrating an operating point in an output operation according to a second embodiment.

FIG. 8 is a diagram illustrating an operating point in output operation according to the second embodiment. The black arrow c in FIG. 8 indicates the output operation, and indicates that the operating point is offset from the fuel efficiency line L2 to move to a high-output side. The output operation is an operation state allowing the operating point to be offset from the fuel efficiency line L2 to move toward the maximum torque line L4, in a range on the high-output side than that at the time of the fixed point operation. The operation range of the engine 2 according to the second embodiment is increased from the operating point a at the time of the fixed point operation to fuel efficiency line operation at the time of the transient operation, and then, from the fuel efficiency line operation to output operation.

Figure 9:
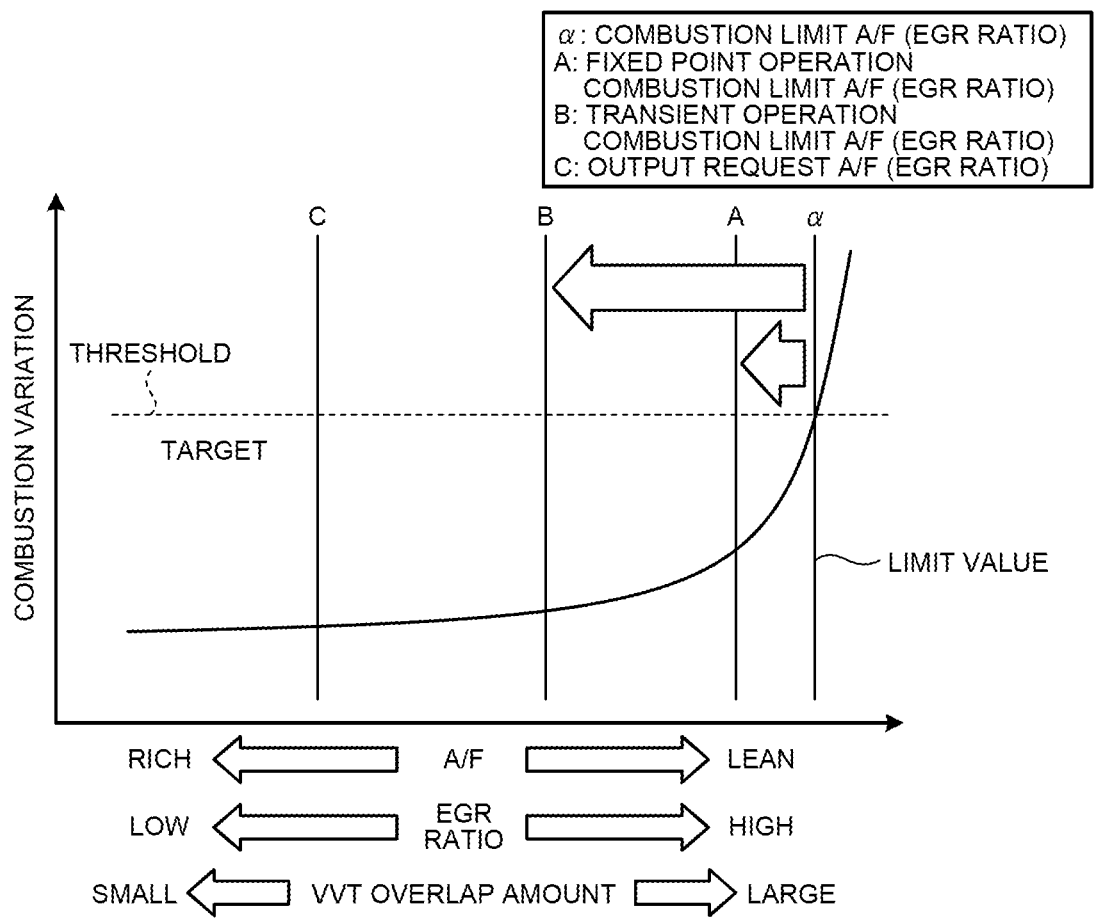
FIG. 9 is a diagram illustrating a relationship between a combustion state and a combustion variation according to the second embodiment.

FIG. 9 is a diagram illustrating a relationship between the combustion state and the combustion variation according to the second embodiment. As illustrated in FIG. 9, to further improve transient performance, the combustion state in the second embodiment can shift from a state with high combustion robustness (B in FIG. 9) to a high-output state (C in FIG. 9). In output operation, the engine 2 is operated in a combustion state of higher output than that at the time of the transient operation. With respect to the air-fuel ratio, the combustion state at the time of the output operation is controlled to a control target value C (control target A/F), which is more on the rich side than the control target value B at the time of the transient operation. With respect to the EGR ratio, the combustion state at the time of the output operation is controlled to a control target value C (control target EGR ratio), which is more on the small side than the control target value B at the time of the transient operation. With respect to the VVT overlap amount, the combustion state at the time of the output operation is controlled to a control target value C, which is more on the small side than the control target value B at the time of the transient operation. Furthermore, in the high-output state at the control target value C, the combustion state is such that the combustion variation is smaller than that at the time of the transient operation at the control target value B.

Figure 10:
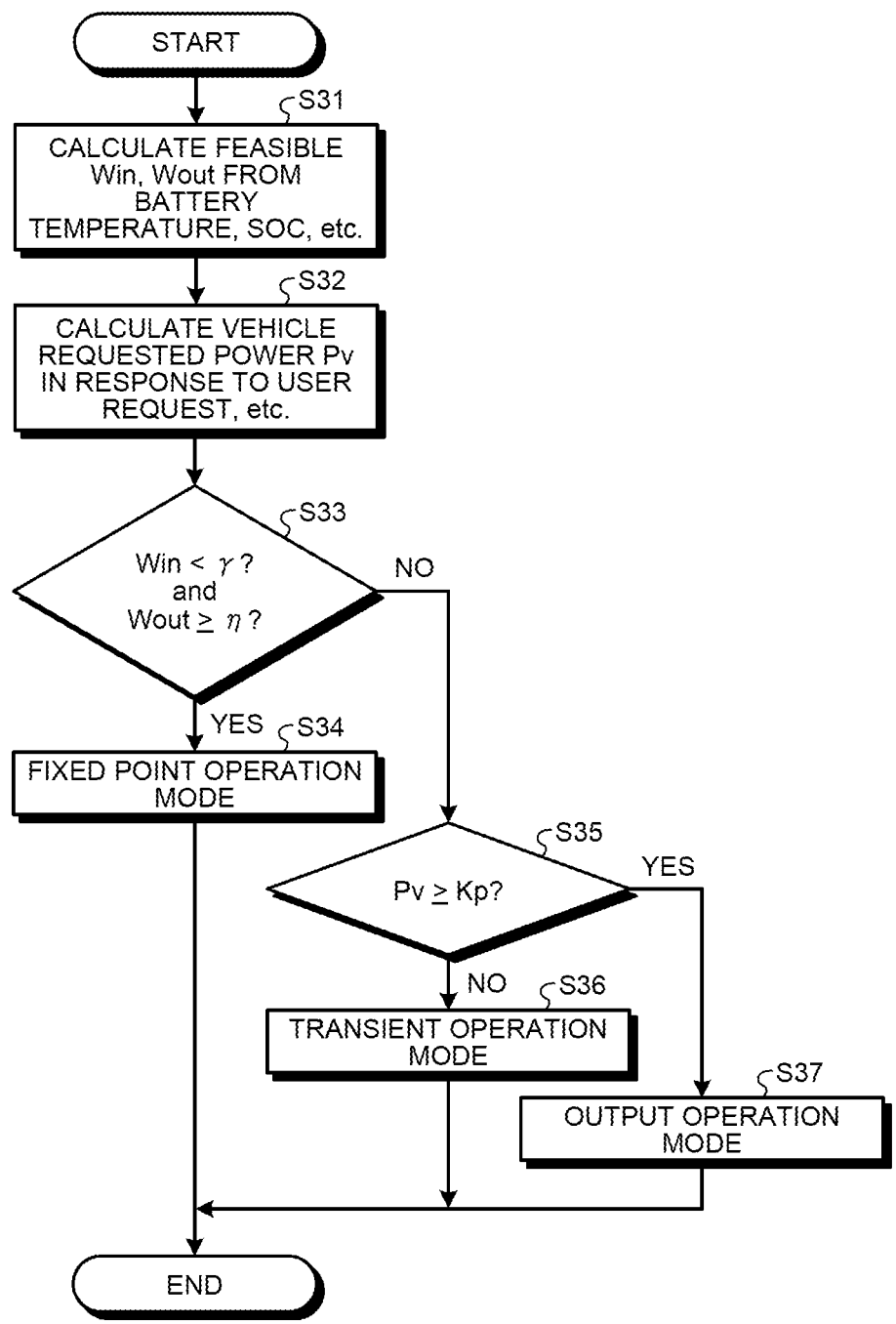
FIG. 10 is a flowchart illustrating a control flow for selecting an operation mode according to the second embodiment.

FIG. 10 is a flowchart illustrating a control flow for selecting an operation mode according to the second embodiment. The control indicated in FIG. 10 is performed by the electronic control unit 8.

As illustrated in FIG. 10, the electronic control unit 8 calculates the chargeable electric power Win and the outputtable electric power Wout of the battery 5 at a current time based on the battery temperature, the SOC and the like (step S31). Step S31 is the same as step S1 of FIG. 5.

The electronic control unit 8 calculates the vehicle requested power Pv in response to a user request or the like (step S32). Step S32 is the same as step S11 of FIG. 6.

The electronic control unit 8 determines whether the chargeable electric power Win is smaller than the adaptive value γ, and whether the outputtable electric power Wout is at or greater than the adaptive value η (step S33).

In the case where the positive determination is made in step S33 (step S33: Yes), the electronic control unit 8 selects the fixed point operation mode (step S34). When step S34 is performed, the control routine ends.

In the case where the negative determination is made in step S33 (step S33: No), the electronic control unit 8 determines whether the vehicle requested power Pv is at or greater than an adaptive value Kp (step S35).

In the case where the negative determination is made in step S35 with the vehicle requested power Pv being smaller than the adaptive value Kp (step S35: No), the electronic control unit 8 selects the transient operation mode (step S36). When step S36 is performed, the control routine ends.

In the case where the positive determination is made in step S35 with the vehicle requested power Pv being at or greater than the adaptive value Kp (step S35: Yes), the electronic control unit 8 selects an output operation mode (step S37). When step S37 is performed, the control routine ends.

Figure 11:
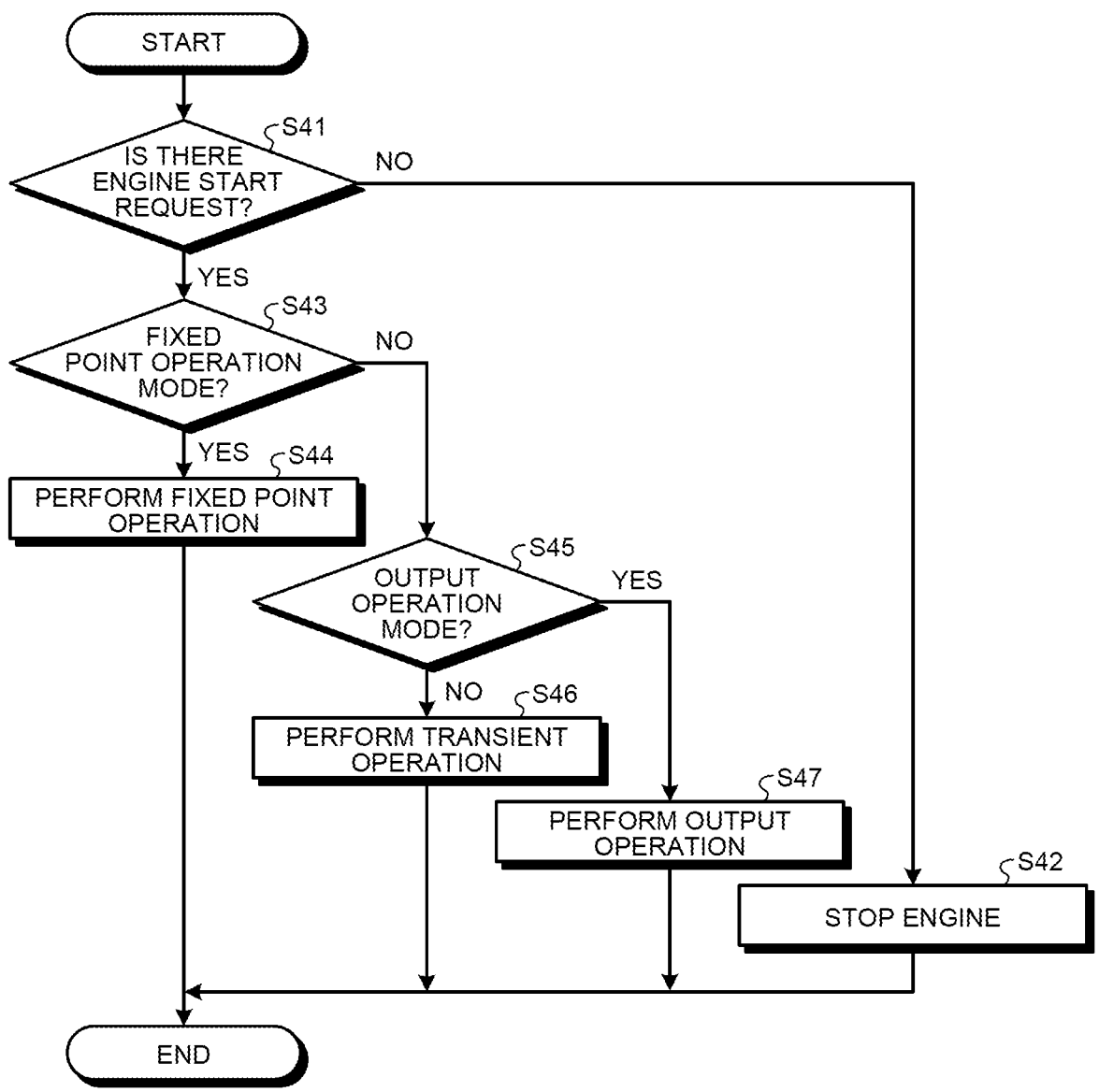
FIG. 11 is a flowchart illustrating an operation control flow according to the second embodiment.

FIG. 11 is a flowchart illustrating an operation control flow according to the second embodiment. The control indicated in FIG. 11 is performed by the electronic control unit 8.

As illustrated in FIG. 11, the electronic control unit 8 determines whether there is an engine start request (step S41). Step S41 is the same as step S21 of FIG. 7.

In the case where the negative determination is made in step S41 due to there being no engine start request (step S41: No), the electronic control unit 8 stops the engine 2 (step S42). When step S42 is performed, the control routine ends.

In the case where the positive determination is made in step S41 due to there being an engine start request (step S41: Yes), the electronic control unit 8 determines whether the operation mode is the fixed point operation mode (step S43). Step S43 is the same as step S23 in FIG. 7. In step S43, whether the fixed point operation mode is selected by execution of step S3 in FIG. 5 is determined. That is, the electronic control unit 8 according to the second embodiment performs the control flow illustrated in FIG. 5 described above.

In the case where the positive determination is made in step S43 due to the operation mode being the fixed point operation mode (step S43: Yes), the electronic control unit 8 performs fixed point operation of the engine 2 (step S44). Step S44 is the same as step S24 in FIG. 7. When step S44 is performed, the control routine ends.

In the case where the negative determination is made in step S43 due to the operation mode not being the fixed point operation mode (step S43: No), the electronic control unit 8 determines whether the operation mode is the output operation mode (step S45). In step S45, whether the output operation mode is selected by execution of step S37 in FIG. 10 is determined.

In the case where the negative determination is made in step S45 due to the operation mode not being the output operation mode (step S45: No), the electronic control unit 8 performs the transient operation of the engine 2 (step S46). Step S46 is the same as step S25 in FIG. 7. When step S46 is performed, the control routine ends.

In the case where the positive determination is made in step S45 due to the operation mode being the output operation mode (step S45: Yes), the electronic control unit 8 performs the output operation of the engine 2 (step S47). In step S47, the output operation as described above is performed. The electronic control unit 8 includes an output operation control unit that performs the output operation. When step S47 is performed, the control routine ends.

As described above, according to the second embodiment, the combustion state of the engine 2 can be changed between combustion efficiency priority and combustion variation priority, in response to the transient operation request for the engine 2. Improvement in fuel efficiency and reduction in combustion variation (drivability) can thus be both achieved regardless of the vehicle request. At the time of the transient operation of the engine 2 in a state where the sum of the engine output Pec at the time of the fixed point operation and the outputtable electric power Wout of the battery 5 is smaller than vehicle requested power Pve, the engine 2 is controlled to a combustion state with a great margin to the combustion limit while reducing thermal efficiency of the engine 2 than at the time of the steady operation. Accordingly, a stable combustion state can be realized at the time of the transient operation of the engine while securing fuel efficiency.

Third Embodiment

In a third embodiment, the fixed point operation of the engine 2 is performed using a plurality of operating points. In the description of the third embodiment, the same elements as those in the first and second embodiments are denoted by the same reference signs, and descriptions thereof are omitted.

The electronic control unit 8 according to the third embodiment performs a first fixed point operation of performing fixed point operation at a first operating point which achieves the maximum thermal efficiency, and second fixed point operation of performing the fixed point operation at a second operating point which is more on a high-output side than the first operating point is. Specifically, the electronic control unit 8 is capable of performing a second fixed point operation at the second operating point on the high-output side when the vehicle requested power Pv is greater than the sum of the engine output Pec at the time of the fixed point operation and the outputtable electric power Wout. In the third embodiment, the SOC of the battery 5 is low, and the amount of chargeable power in the battery 5 is great, and thus, the fixed point operation range can be set on the more high-output side.

Figure 12:
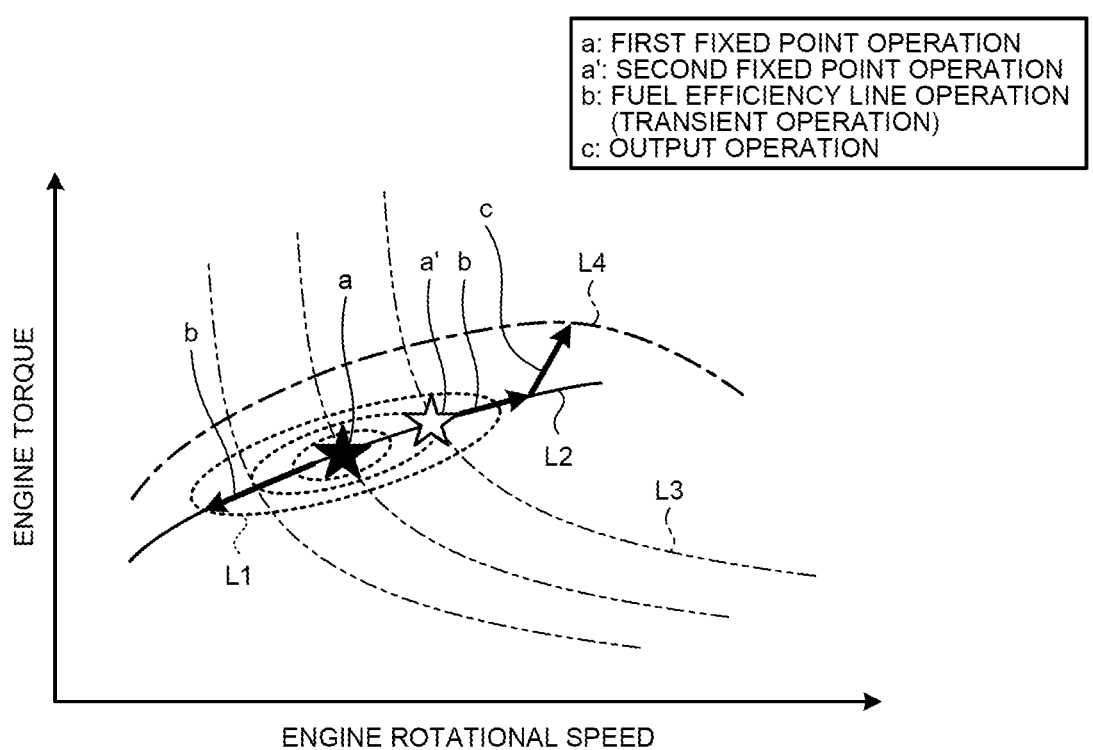
FIG. 12 is a diagram illustrating a fixed point operation according to a third embodiment.

FIG. 12 is a diagram illustrating the fixed point operation according to the third embodiment. As illustrated in FIG. 12, an operating point a of the first fixed point operation (hereinafter "first operating point a") is an operating point where optimum thermal efficiency is achieved. An operating point a' of second fixed point operation (hereinafter "second operating point a'") is an operating point which is more on the high-output side than the first operating point a is, and which is within a range where relatively high efficiency is achieved. The first and second operating points a and a' are on the fuel efficiency line L2. The second operating point a' is more on a low thermal-efficiency side and more on the high-output side than the first operating point a is. A combustion state in first fixed point operation and a combustion state in second fixed point operation are combustion states which are controlled to the control target value A, similar to the combustion state in the fixed point operation illustrated of FIG. 4 or 9.

For example, in the case of shifting from a first fixed point operation state to a transient operation state, the state is shifted to an operation state in which the operating point moves on the fuel efficiency line L2 from the first operating point a. In the case of shifting from a second fixed point operation state to the transient operation state, the state is shifted to an operation state in which the operating point moves on the fuel efficiency line L2 from the second operating point a'. Also in the third embodiment, similar to the second embodiment, the transient operation state can be shifted to an output operation state.

Figure 13:
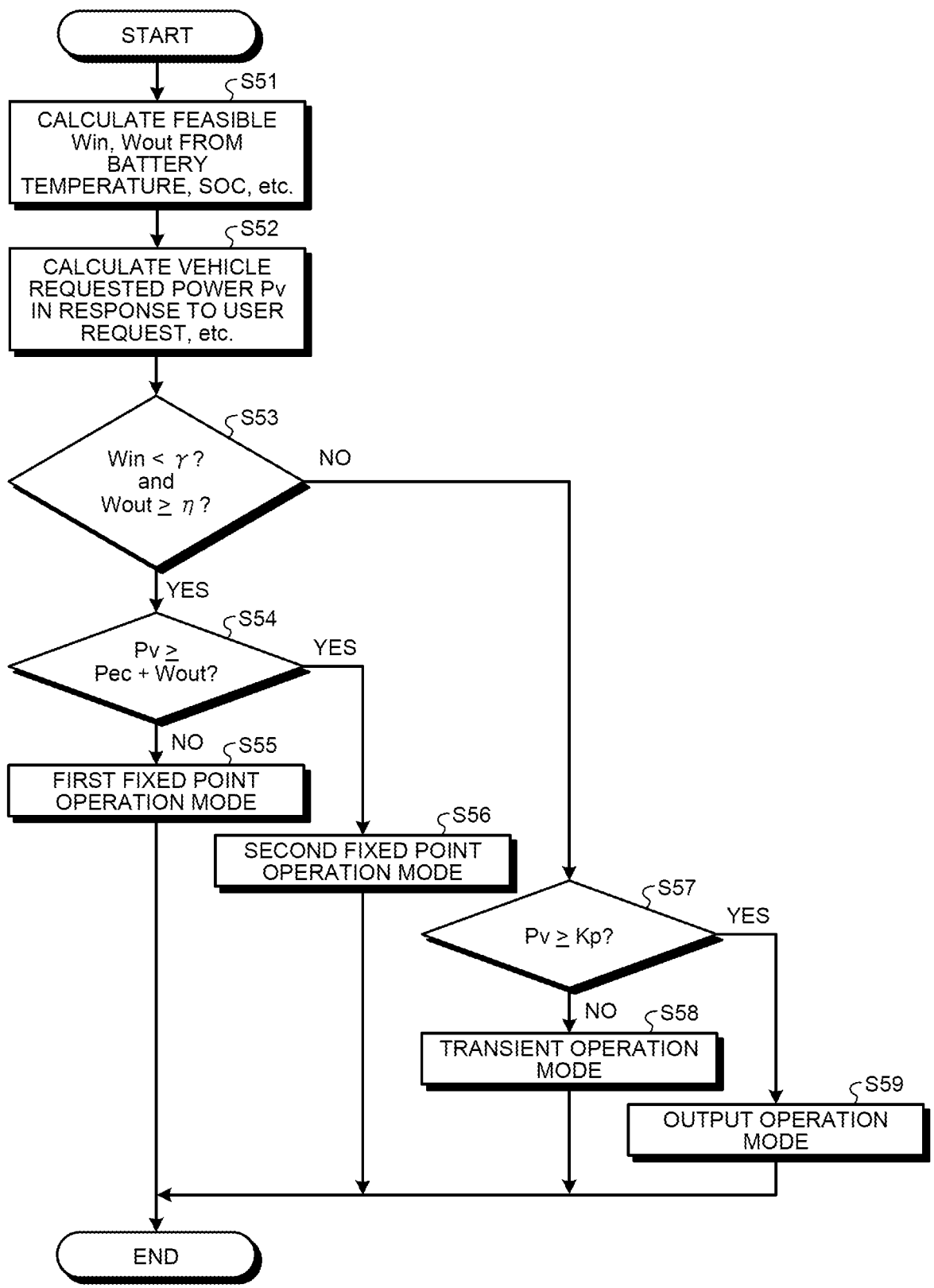
FIG. 13 is a flowchart illustrating a control flow for selecting an operation mode according to the third embodiment.

FIG. 13 is a flowchart illustrating a control flow for selecting an operation mode according to the third embodiment. The control indicated in FIG. 13 is performed by the electronic control unit 8.

As illustrated in FIG. 13, the electronic control unit 8 calculates the chargeable electric power Win and the outputtable electric power Wout of the battery 5 at a current time based on the battery temperature, the SOC and the like (step S51). Step S51 is the same as step S1 of FIG. 5.

The electronic control unit 8 calculates the vehicle requested power Pv in response to a user request or the like (step S52). Step S52 is the same as step S11 in FIG. 6.

The electronic control unit 8 determines whether the chargeable electric power Win is smaller than the adaptive value γ, and whether the outputtable electric power Wout is at or greater than the adaptive value η (step S53).

In the case where the positive determination is made in step S53 (step S53: Yes), the electronic control unit 8 determines whether the vehicle requested power Pv is equal to or greater than the sum of the engine output Pec at the time of the fixed point operation and the current outputtable electric power Wout (step S54). The engine output Pec at the time of the fixed point operation is calculated by the electronic control unit 8. In step S54, whether the vehicle requested power Pv calculated in step S52 is equal to or greater than the sum of the engine output Pec at the time of the fixed point operation and the outputtable electric power Wout calculated in step S51 is determined.

In the case where the negative determination is made in step S54 (step S54: No), the electronic control unit 8 selects a first fixed point operation mode (step S55). When step S55 is performed, th3 control routine ends.

In the case where the positive determination is made in step S54 (step S54: Yes), the electronic control unit 8 selects a second fixed point operation mode (step S56). When step S56 is performed, the control routine ends.

In the case where the negative determination is made in step S53 (step S53: No), the electronic control unit 8 determines whether the vehicle requested power Pv is at or greater than the adaptive value Kp (step S57).

In the case where the negative determination is made in step S57 due to the vehicle requested power Pv being smaller than the adaptive value Kp (step S57: No), the electronic control unit 8 selects the transient operation mode (step S58). When step S58 is performed, the control routine ends.

In the case where the positive determination is made in step S57 with the vehicle requested power Pv being at or greater than the adaptive value Kp (step S57: Yes), the electronic control unit 8 selects the output operation mode (step S59). When step S59 is performed, the control routine ends.

Figure 14:
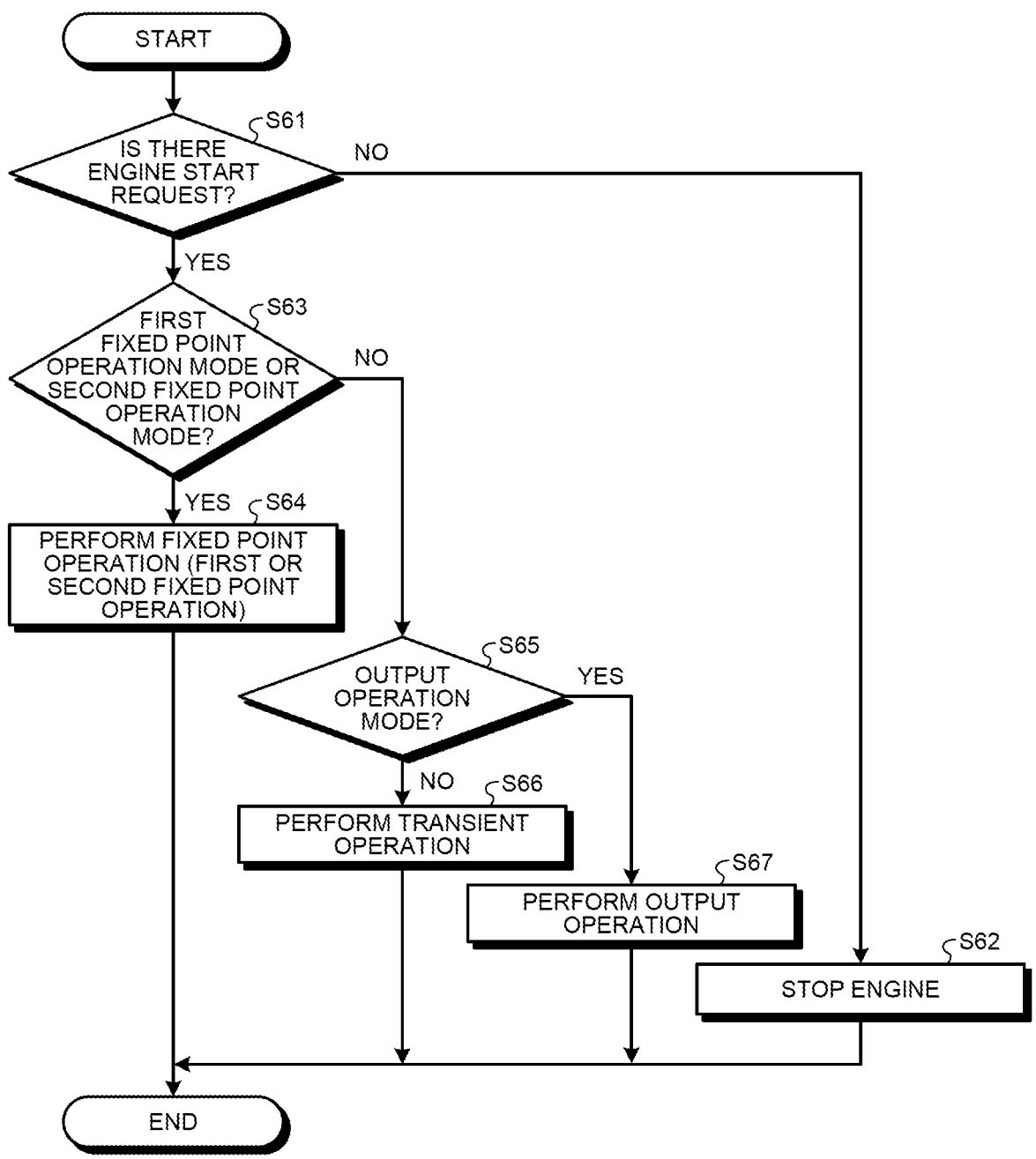
FIG. 14 is a flowchart illustrating an operation control flow according to the third embodiment.

FIG. 14 is a flowchart illustrating an operation control flow according to the third embodiment. The control indicated in FIG. 14 is performed by the electronic control unit 8.

As illustrated in FIG. 14, the electronic control unit 8 determines whether there is an engine start request (step S61). Step S61 is the same as step S21 in FIG. 7.

In the case where the negative determination is made in step S61 due to there being no engine start request (step S61: No), the electronic control unit 8 stops the engine 2 (step S62). When step S62 is performed, the control routine ends.

In the case where the positive determination is made in step S61 due to there being an engine start request (step S61:

Yes), the electronic control unit 8 determines whether the operation mode is the first fixed point operation mode or the second fixed point operation mode (step S63). In step S63, whether the fixed point operation mode is selected by the execution of step S55 or step S56 in FIG. 13 is determined.

In the case where the positive determination is made in step S63 due to the operation mode being the first fixed point operation mode or the second fixed point operation mode (step S63: Yes), the electronic control unit 8 performs the fixed point operation of the engine 2 (step S64). In step S64, the first fixed point operation is performed in the case where the first fixed point operation mode is selected, and the second fixed point operation is performed in the case where the second fixed point operation mode is selected. When step S64 is performed, the control routine ends.

In the case where the negative determination is made in step S63 due to the operation mode being neither the first fixed point operation mode nor the second fixed point operation mode (step S63: No), the electronic control unit 8 determines whether the operation mode is the output operation mode (step S65). In step S65, whether the output operation mode is selected by the execution of step S59 in FIG. 13 is determined.

In the case where the negative determination is made in step S65 due to the operation mode not being the output operation mode (step S65: No), the electronic control unit 8 performs the transient operation of the engine 2 (step S66). When step S66 is performed, the control routine ends.

In the case where the positive determination is made in step S65 due to the operation mode being the output operation mode (step S65: Yes), the electronic control unit 8 performs the output operation of the engine 2 (step S67). When step S67 is performed, the control routine ends.

As described above, according to the third embodiment, the combustion state of the engine 2 can be changed between combustion efficiency priority and combustion variation priority, in response to a transient operation request for the engine 2. Improvement in fuel efficiency and reduction in combustion variation (drivability) can thus be both achieved regardless of the vehicle request. Furthermore, in the case where the sum of the engine output Pec at the time of the fixed point operation and the outputtable electric power Wout of the battery 5 is greater than the vehicle requested power Pv, the second fixed point operation can be performed at the second operating point which is on the high-output side than at the time of the first fixed point operation.

Example Modification

Figure 15:
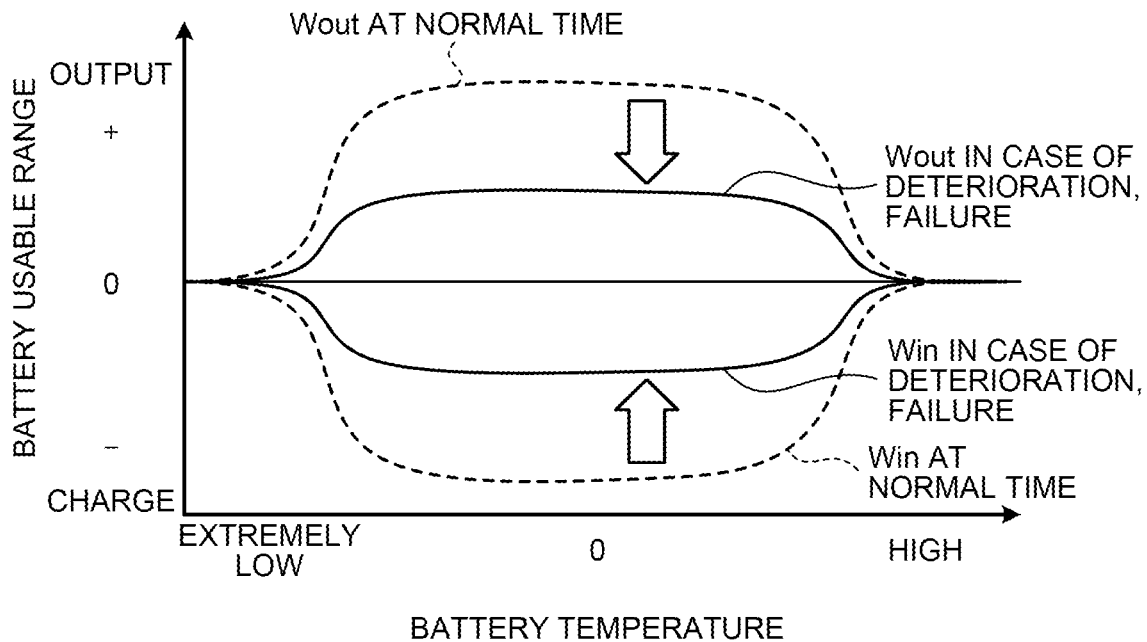
FIG. 15 is an explanatory diagram illustrating a battery usable range in case of deterioration or failure.

As an example modification of each of the embodiments described above, the electronic control unit 8 may detect a deterioration/failure state of the battery 5, and may perform the transient operation of the engine 2 based on the detection result. FIG. 15 is an explanatory diagram illustrating a battery usable range in the case of a deterioration or failure. As illustrated in FIG. 15, in the case of a deterioration or failure, ranges of the chargeable electric power Win and the outputtable electric power Wout are made smaller than what they normally are. Accordingly, when the deterioration or failure of the battery 5 is detected, the electronic control unit 8 reduces the outputtable electric power Wout and the chargeable electric power Win so as to enable the selection of the steady operation or the transient operation mode and perform operation in an optimum combustion state. For example, in step S1 of FIG. 5 described above, in the case where the deterioration or failure is detected, an operation state with higher combustion robustness can be achieved by calculating outputtable electric power Wout and the chargeable electric power Win to be smaller than what they normally are.

Furthermore, the hybrid vehicle to which the embodiments described above can be applied is not limited to a series-type as illustrated in FIG. 1, and may be a parallel-type. In the case of application to a parallel hybrid vehicle, the power output from the engine 2 and the power output from a motor-generator are transmitted to the driving wheels by a transmission mechanism. The motor-generator which exhibits an electric power generation function by the power from the engine 2 may exhibit a motor function by the electric power from the battery 5 and may output power (motor torque) to be transmitted to the driving wheels. With the parallel hybrid vehicle, control is performed to achieve an approximately steady operation state in which the operating point of the engine 2 is not fixed but is movable in a range with high thermal efficiency. Steady operation of the parallel hybrid vehicle is an operation state in which the operating point is movable within an operation range in which an amount of change in the engine rotational speed is small and an amount of change in engine torque is small. With respect to the operation state, the thermal efficiency of the engine 2 is higher at the time of fixed point operation of the series hybrid vehicle than that at the time of steady operation of the parallel hybrid vehicle. Additionally, the hybrid vehicle is capable of reducing transient operation of the engine 2 regardless of being a series-type or a parallel-type, and the engine 2 can be operated in a state with higher combustion efficiency.

According to the present disclosure, in the case where the outputtable electric power of the battery is small at the time of the transient operation of the engine, the engine is controlled to be in a combustion state with a great margin to the combustion limit while reducing thermal efficiency of the engine than at the time of the steady operation, and thus, a stable combustion state can be realized at the time of the transient operation of the engine while securing fuel efficiency.

According to an embodiment, the engine can be operated in a fuel-efficient state at the time of the steady operation, and be controlled to a combustion state with a great margin to the combustion limit at the time of the transient operation, and thus, the combustion state of the engine is stabilized. Fuel efficiency and drivability can thus be both achieved.

According to an embodiment, the series hybrid vehicle can perform the first fixed point operation at the first operating point that achieves the maximum thermal efficiency, and the second fixed point operation at the second operating point on the high-output side. In the case where the outputtable electric power of the battery is small, the fixed point operation is performed at the second operating point on the high-output side so that the combustion state of the engine is stabilized, and control is thus performed to achieve a combustion state with high combustion efficiency.

According to an embodiment, with respect to the engine which is capable of lean-burn operation, control is performed at the time of the transient operation to achieve an air-fuel ratio with a great margin to an air-fuel ratio at the combustion limit, and thus, the combustion state of the engine can be stabilized while securing the fuel efficiency.

According to an embodiment, with respect to the engine including the exhaust gas recirculation device, control is performed at the time of the transient operation to achieve an EGR ratio with a great margin to an EGR ratio at the combustion limit, and thus, the combustion state of the engine can be stabilized while securing fuel efficiency.

According to an embodiment, with respect to the engine including the variable valve timing mechanism, control is performed at the time of the transient operation to achieve a valve overlap amount with a great margin to a valve overlap amount at the combustion limit, and thus, the combustion state of the engine can be stabilized while securing fuel efficiency.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device of a hybrid vehicle, the hybrid vehicle comprising an engine, a motor as a traveling power source, and a battery in which electric power to be supplied to the motor is stored, the control device comprising:
   a transient operation controller configured to, based on absolute values of an outputtable electric power and a chargeable electric power of the battery being smaller than respective predetermined values at a time of a transient operation of the engine, perform a transient operation of:
      controlling an operating point of the engine within a wide range from low output to high output, at a position where a thermal efficiency of the engine is lower than the thermal efficiency of the engine at a time of a steady operation, and
      controlling the engine to operate in a combustion state where a margin to a combustion limit is greater than the margin in the steady operation,
   wherein the outputtable electric power and the chargeable electric power are calculated based on a temperature of the battery or a state of charge of the battery.

2. The control device of the hybrid vehicle according to claim 1, wherein
   the hybrid vehicle is a series hybrid vehicle, and
   the control device further comprises:
      a fixed point operation controller configured to perform, in the steady operation, a fixed point operation in which the operating point of the engine is fixed at an operating point where high thermal efficiency is achieved, and
      an output operation controller configured to perform, in a case where vehicle requested power is at or greater than a predetermined value, an output operation of:
         controlling the operating point of the engine to be at a position which is closer to a high-output side than the operating point in the transient operation, and
         controlling the engine to operate in a combustion state with a greater margin to the combustion limit than the margin in the transient operation.

3. The control device of the hybrid vehicle according to claim 2, wherein
   the fixed point operation controller comprises:
      a first fixed point operation controller configured to perform a first fixed point operation of performing a fixed point operation at a first operating point that achieves a maximum thermal efficiency of the engine; and
      a second fixed point operation controller configured to perform a second fixed point operation of performing a fixed point operation at a second operating point that is positioned on a low thermal-efficiency side and on the high-output side of the first operating point, and
   wherein the first fixed point operation controller is configured to:
      perform the first fixed point operation in a case where the vehicle requested power is smaller than a sum of engine output in a fixed point operation state and the outputtable electric power of the battery, and
      performs the second fixed point operation in a case where the vehicle requested power is at or greater than the sum of the engine output in the fixed point operation state and the outputtable electric power of the battery.

4. The control device of the hybrid vehicle according to claim 1, wherein
   the engine is configured to perform a lean-burn operation, and
   the transient operation controller is further configured to control an air-fuel ratio in the transient operation to be an air-fuel ratio that is on a rich side of a limit value on which a lean side is within a range of an air-fuel ratio that achieves a stable combustion in the steady operation.

5. The control device of the hybrid vehicle according to claim 1, wherein
   the engine comprises an exhaust gas recirculation device that is configured to recirculate a portion of exhaust gas, as EGR gas, from an exhaust passage to an intake passage through an EGR valve, and
   the transient operation controller is configured to control an EGR ratio in the transient operation to be an EGR ratio that is on an EGR gas small-amount side of a limit value on which an EGR gas large-amount side is within a range of an EGR ratio where a stable combustion is achieved in the steady operation.

6. The control device of the hybrid vehicle according to claim 1, wherein
   the engine comprises a variable valve timing mechanism that is configured to change a valve overlap amount with respect to an intake valve and an exhaust valve, and
   the transient operation controller is further configured to control a valve overlap amount in the transient operation to be a valve overlap amount on a smaller-amount side of a limit value on which a larger-amount side is where the overlap amount is within a range of the valve overlap amount where a stable combustion is achieved in the steady operation.

* * * * *